US012046438B2

(12) United States Patent
Zerr et al.

(10) Patent No.: US 12,046,438 B2
(45) Date of Patent: Jul. 23, 2024

(54) SWITCH ASSEMBLY AND METHOD FOR SAFELY OPERATING A SWITCH ASSEMBLY

(71) Applicant: Maschinenfabrik Reinhausen GmbH, Regensburg (DE)

(72) Inventors: Eduard Zerr, Regensburg (DE); Klaus Ixmeier, Thumhausen (DE)

(73) Assignee: MASCHINENFABRIK REINHAUSEN GMBH, Regensburg (DE)

( * ) Notice: Subject to any disclaimer, the term of this patent is extended or adjusted under 35 U.S.C. 154(b) by 345 days.

(21) Appl. No.: 17/608,162

(22) PCT Filed: Apr. 23, 2020

(86) PCT No.: PCT/EP2020/061291
§ 371 (c)(1),
(2) Date: Nov. 2, 2021

(87) PCT Pub. No.: WO2020/229128
PCT Pub. Date: Nov. 19, 2020

(65) Prior Publication Data

US 2022/0254580 A1 Aug. 11, 2022

(30) Foreign Application Priority Data

May 15, 2019 (DE) ..................... 10 2019 112 713.0

(51) Int. Cl.
*H01H 9/54* (2006.01)
*H01H 3/26* (2006.01)
*H01H 9/00* (2006.01)

(52) U.S. Cl.
CPC ................ *H01H 9/54* (2013.01); *H01H 3/26* (2013.01); *H01H 9/0005* (2013.01)

(58) Field of Classification Search
CPC ...... H01H 9/00; H01H 9/0005; H01H 9/0011; H01H 9/0016; H01H 9/0027; H01H 9/54;
(Continued)

(56) References Cited

U.S. PATENT DOCUMENTS

2005/0116670 A1* 6/2005 Lathrop .................. H01H 3/26 318/261
2007/0057652 A1 3/2007 Hoffman et al.
(Continued)

FOREIGN PATENT DOCUMENTS

DE 1239012 B 4/1967
DE 10045651 A1 4/2002
(Continued)

*Primary Examiner* — Anthony R Jimenez
(74) *Attorney, Agent, or Firm* — LEYDIG VOIT & MAYER LTD.

(57) ABSTRACT

A switch assembly including a switch and a drive system for the switch. The drive system includes a motor for driving the switch, a control device with a power section for supplying power to the motor, a controller for initiating a switching operation of the switch by control of the power section, and a protection circuit. The protection circuit is configured to detect a first error signal via a state contact of the controller in the event of a malfunction of the controller, detect a second error signal via a state contact of the power section in the event of a malfunction of the power section, and initiate a safety measure depending on the first and the second error signal. The control device is configured to activate the protection circuit prior to the switching operation being initiated and to deactivate it following successful execution of the switching operation.

14 Claims, 3 Drawing Sheets

(58) Field of Classification Search

CPC .......... H01H 9/541; H01H 9/56; H01H 9/563; H01H 3/00; H01H 3/22; H01H 3/26; H01H 3/30; H01H 3/32; H01H 3/3005; H01H 2003/26; H01H 2003/266; H01H 2071/04; H01H 2071/044; H01H 2009/0033; H01H 2009/0061; H01H 2009/0038; H02P 13/00; H02P 13/06; G05B 9/02; B60W 50/00; B60W 50/02; B60W 50/023; B60W 50/029; B60W 2050/022; B60W 2050/04; B60W 2050/045; B60W 2050/0292

USPC .......................................................... 200/329

See application file for complete search history.

(56) References Cited

U.S. PATENT DOCUMENTS

| | | | |
|---|---|---|---|
| 2011/0095710 | A1 | 4/2011 | Guillon et al. |
| 2015/0061806 | A1 | 3/2015 | Teising et al. |
| 2019/0237274 | A1 | 8/2019 | Hilker |

FOREIGN PATENT DOCUMENTS

| | | | |
|---|---|---|---|
| DE | 102011002685 | B3 | 4/2012 |
| WO | WO 0223207 | A1 | 3/2002 |
| WO | WO 2009156635 | A1 | 12/2009 |
| WO | WO 2018054672 | A1 | 3/2018 |

* cited by examiner

SWITCH ASSEMBLY AND METHOD FOR SAFELY OPERATING A SWITCH ASSEMBLY

CROSS REFERENCE TO RELATED APPLICATIONS

This application is a U.S. National Phase application under 35 U.S.C. § 371 of International Application No. PCT/EP2020/061291, filed on Apr. 23, 2020, and claims benefit to German Patent Application No. DE 10 2019 112 713.0, filed on May 15, 2019. The International Application was published in German on Nov. 19, 2020 as WO 2020/229128 A1 under PCT Article 21(2).

FIELD

The invention relates to a switch assembly comprising a switch and a drive system for the switch, to an item of electrical equipment comprising a switch assembly, and to a method for safely operating a switch assembly.

BACKGROUND

In substations, there are a large number of switches for different tasks and with different requirements. To operate the various switches, they must be driven via a drive system. These switches include, amongst others, on-load tap-changers, diverter switches, selectors, double reversing change-over selectors, reversing change-over selectors, change-over selectors, circuit breakers, on-load switches or disconnecting switches.

For example, on-load tap-changers are used for uninterrupted switchover between different winding taps of an item of electrical equipment, such as a power transformer or a controllable reactor. For example, this makes it possible for the transmission ratio of the transformer or the inductance of the reactor to be changed. Double reversing change-over selectors are used to reverse the polarity of windings during power transformer operation.

All of these switches represent a highly safety-relevant component of the electrical equipment, because the switchover takes place while the equipment is in operation and is accordingly connected to a power network, for example. In extreme cases, malfunctions during operation can have serious technical and economic consequences.

SUMMARY

In an embodiment, the present invention provides a switch assembly including a switch and a drive system for the switch. The drive system includes a motor for driving the switch, a control device with a power section for supplying power to the motor, a controller for initiating a switching operation of the switch by control of the power section, and a protection circuit. The protection circuit is configured to detect a first error signal via a state contact of the controller in the event of a malfunction of the controller, detect a second error signal via a state contact of the power section in the event of a malfunction of the power section, and initiate a safety measure depending on the first and the second error signal. The control device is configured to activate the protection circuit prior to the switching operation being initiated and to deactivate it following successful execution of the switching operation.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
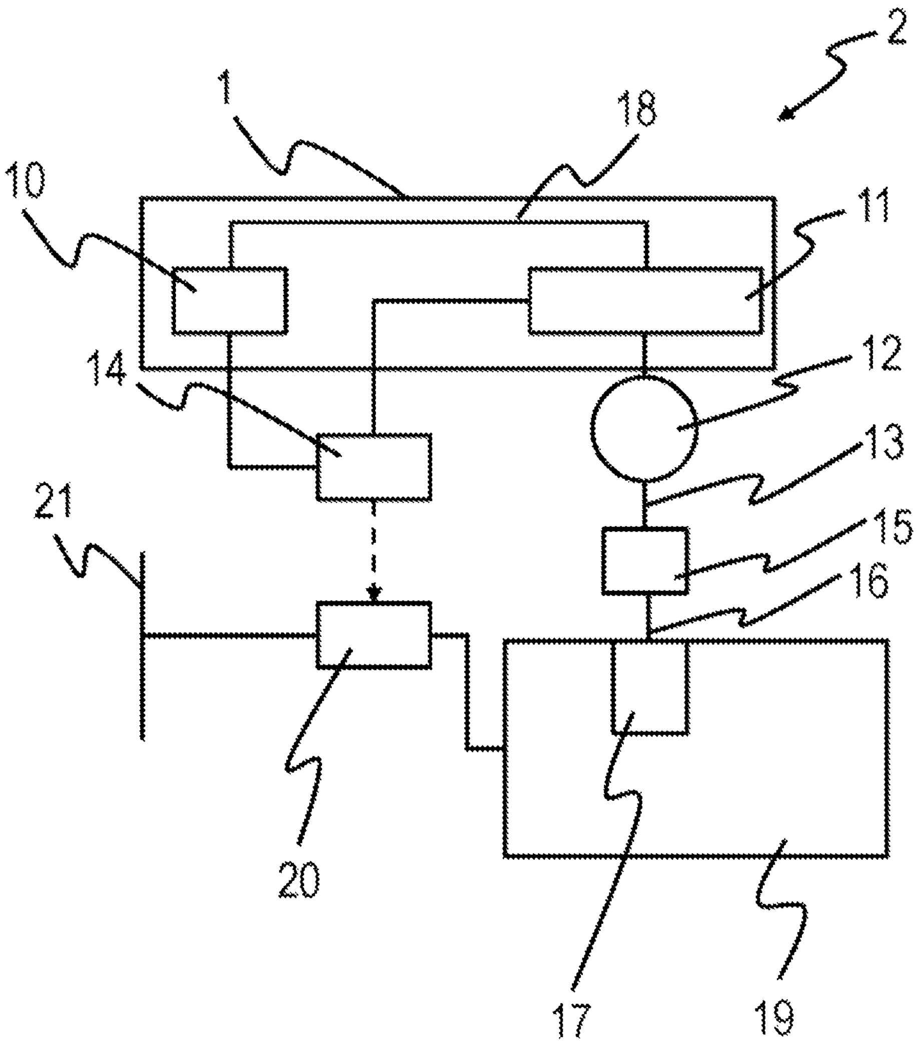
FIG. 1 is a schematic representation of an exemplary embodiment of a switch assembly according to the improved concept.

Embodiments of the present invention provide an improved concept for driving a switch, such as an on-load tap-changer, diverter switch, selector, double reversing change-over selector, reversing change-over selector or change-over selector, by means of which the operational reliability is increased.

Various embodiments of the present disclosure are based, inter alia, on the idea of detecting disturbances of a control unit, of a motor, and of a power section for driving a switch with a protection circuit, and the idea of initiating a safety measure as appropriate. Malfunctions of the motor are detected here indirectly via the power section. In this case, the protection circuit is activated before a switching operation is initiated and deactivated following successful execution of the switching operation.

In an embodiment according to the improved concept, a switch assembly including a switch and a drive system for the switch is provided. The drive system has a motor for driving the switch, a protection circuit and a control device with a power section for supplying power to the motor. The control device additionally has a control unit for initiating a switching operation of the switch by control of the power section. The protection circuit is configured, in the event of a malfunction of the control unit, to detect a first error signal via a state contact and, in the event of a malfunction of the power section or of the motor, to detect a second error signal via a state contact of the power section. In addition, the protection circuit is configured to initiate a safety measure depending on the first and the second error signal. The control device, in particular the control unit and/or the power section, is configured to activate the protection circuit prior to the switching operation of the switch being initiated and to deactivate the protection circuit following successful execution of the switching operation.

According to at least one embodiment of the switch assemblies, the switching operation comprises a full switchover of the switch, that is to say in the case of an on-load tap-changer a full switchover between two winding taps of an item of electrical equipment assigned to the switch assembly, such as a power transformer or a reactor.

According to at least one embodiment, the switch of the switch assembly is an on-load tap-changer, a selector or a change-over selector, a diverter switch, a reversing change-over selector, or a double reversing change-over selector.

According to at least one embodiment, the switching operation comprises part of the switchover of the switch.

According to at least one embodiment of the switch assemblies, the switching operation comprises a full switchover of an on-load tap-changer, that is to say a full switchover between two winding taps of an item of electrical equipment assigned to the on-load tap-changer, such as a power transformer or a reactor.

According to at least one embodiment, the switching operation comprises part of the switchover of the on-load tap-changer, for example a change-over selector switch operation, a reversing change-over selector switch operation, or a diverter switch operation or in each case a part thereof.

Generally, the switching operation may correspond to a critical part of the switchover, during which a fault of the motor or of the power section may have serious consequences, for example a tap short-circuit.

According to at least one embodiment, the protection circuit detects the error signals only in the activated state and/or initiates the safety measure only in the activated state.

According to at least one embodiment, the protection circuit is formed separately from the power section, the control unit and the motor.

According to at least one embodiment, parts of the protection circuit include by the power section, the control unit and/or the motor.

According to at least one embodiment, the initiation of the safety measure comprises the output of a signal to an output of the protection circuit, for example a short-circuiting of two output contacts.

According to at least one embodiment, the switch may be assigned to an item of electrical equipment or may be installed on or in the electrical equipment. The safety measure comprises a disconnection of the equipment from a power network, for example by actuation of a circuit breaker. If the circuit breaker is not actuated, it connects the equipment to the power network.

By monitoring the state contacts, both of the control unit and of the power section (and of the motor, which is connected to the power section), and by initiating the safety measure accordingly by the activated protection circuit, the operational reliability of the switch assembly or of the equipment can be increased. A safety risk as a result of faults of movement-relevant components, such as the motor and power section, during critical switching operations is reduced. This is advantageous in particular for critical switching operations which can no longer be stopped or can no longer be stopped safely once initiated, or for critical switching operations which cannot be stopped since this would result in an inadmissible state of the switch.

If the protection circuit is not activated, for example if the switch is in a safe or uncritical position or a safe or uncritical state, the safety measure is not initiated. Particularly, the equipment is not disconnected from the power network. The availability of the equipment is thus still ensured in spite of increased safety.

According to at least one embodiment, the protection circuit is configured to initiate the safety measure only if the first error signal indicates a malfunction of the power section (or of the motor) and the second error signal indicates a malfunction of the control unit. It is not ruled out that further conditions must be satisfied so that the safety measure is initiated.

In such embodiments, the safety measure is thus initiated only in the event of the failure or the malfunction of a plurality of, for example all, components of the switch assembly.

According to at least one embodiment, the switch assembly is configured to respond to a malfunction or a failure of a movement-relevant component by initiating a further safety measure.

In such embodiments, for example, the initiation of the further safety measures may be dependent on specific conditions, such as a position of the switch. The protection circuit is not necessarily relevant here in the first instance. Only if a plurality of, in particular all, components display malfunctions does the protection circuit, if activated, initiate the safety measure.

According to at least one embodiment, the switch, in particular on-load tap-changer, comprises an accumulator device for storing mechanical energy, for example a spring energy accumulator. The accumulator device may be charged by the drive system via a drive shaft and, when a certain position of the drive shaft is reached, the stored energy may be released suddenly, so that the diverter switch operation can be implemented within the shortest possible time. It is thus ensured that an initiated diverter switch operation is always completed. In such embodiments, the drive system may be designed as a servo drive system, however, this is not absolutely necessary. In such embodiments, the switching operation may include, for example, a change-over selector operation.

According to at least one embodiment, the switch is designed as a directly driven on-load tap-changer. This means that it does not have an accumulator device for storing mechanical energy and the drive system is designed as a servo drive system. In such embodiments, it must be ensured by means of other suitable means, for example, the drive system, that, for example, the diverter switch operation is completed once it has been initiated. In such embodiments, it is particularly advantageous if the switching operation contains the diverter switch operation.

According to at least one embodiment, the control unit is configured to activate the protection circuit prior to the switching operation being initiated and/or to deactivate the protection circuit following successful execution of the switching operation.

According to at least one embodiment, the power section is configured to activate the protection circuit prior to the switching operation being initiated and/or to deactivate the protection circuit following successful execution of the switching operation.

According to at least one embodiment, the control unit is configured to activate the protection circuit prior to the switching operation being initiated and to deactivate the power section following successful execution of the switching operation.

According to at least one embodiment, the power section is configured to activate the protection circuit prior to the switching operation being initiated and to deactivate the control unit following successful execution of the switching operation.

According to at least one embodiment, the protection circuit comprises a bistable switching element, in particular a bistable relay. The control device, in particular the control unit, is configured to actuate the bistable switching element in order to activate and/or deactivate the protection circuit. The control device, in particular the power section, is configured to actuate the bistable switching element in order to activate and/or deactivate the protection circuit.

According to at least one embodiment, the protection circuit comprises a series circuit which connects a first switch unit, a second switch unit and the bistable switching element. The first switch unit is coupled to the state contact of the power section, and the second switch unit is coupled to the state contact of the control unit.

According to at least one embodiment, the first switch unit comprises one or more parallel-connected switches, at least one of which must be closed in order for the protection circuit to be able to initiate the safety measure.

According to at least one embodiment, the second switch unit comprises one or more parallel-connected switches, at least one of which must be closed in order for the protection circuit to be able to initiate the safety measure.

According to at least one embodiment, the first switch unit comprises one or more parallel-connected switches, which can each be closed by an individual power section. According to at least one embodiment, the drive system is designed as a servo drive system. The power section comprises one or more converters, in particular servo converters, equivalent electronic, in particular fully electronic, units for drive machines. In particular, the power section comprises one converter per driven axis.

According to at least one embodiment, the on-load tap-changer is multi-phase, in particular for a multi-phase item of equipment. The power section comprises one converter per phase.

According to at least one embodiment, the power section is designed as an electromechanical unit for drive machines.

According to at least one embodiment, the switch assembly comprises a further movement-relevant component, in particular a further motor or a further power section. The protection circuit comprises a further switch unit, which is connected in series to the first and second switch unit and is coupled to a state contact of the further movement-relevant component. The further switch unit comprises one or more parallel-connected switches, at least one of which must be closed in order for the protection circuit to be able to initiate the safety measure.

According to embodiments of the improved concept, an item of electrical equipment is also described, which comprises a switch assembly according to the improved concept, for example a tap changer assembly. The on-load tap-changer of the tap changer assembly is assigned to the electrical equipment or is installed on or in the electrical equipment. The safety measure comprises a disconnection of the equipment from a power network.

According to embodiments of the improved concept, an equipment assembly is also described. The equipment assembly comprises an item of electrical equipment according to the improved concept and a circuit breaker for disconnecting the equipment from the power network, where the safety measure includes an actuation of the circuit breaker.

According to embodiments of the improved concept, a method for safely operating a switch assembly is also disclosed. The method comprises activating a protection circuit, initiating a switching operation of the switch by control of the power section once the protection circuit has been activated, detecting a first error signal via a state contact of a motor of the drive system, detecting a second error signal via a state contact of a power section of the drive system, initiating a safety measure depending on the first and the second error signal, and deactivating the protection circuit following successful execution of the switching operation.

According to embodiments of the improved concept, a method for safely operating a tap changer assembly is also described. The method comprises activating a protection circuit, initiating a switching operation of the on-load tap-changer by control of the power section once the protection circuit has been activated, detecting a first error signal via a state contact of a motor of the drive system, detecting a second error signal via a state contact of a power section of the drive system, initiating a safety measure depending on the first and the second error signal, and deactivating the protection circuit following successful execution of the switching operation.

Further embodiments and implementations of the method, the equipment and the equipment assembly are directly evident from the various embodiments of the switch assembly, and vice versa.

In the following, the invention is explained in detail based on exemplary embodiments with reference to the drawings. Components which are identical or functionally identical or which have an identical effect may be provided with identical reference signs. Identical components or components having an identical function may in some cases be explained only in relation to the figure in which they first appear. The explanation is not necessarily repeated in the subsequent figures.

FIG. 1 shows a schematic representation of an exemplary embodiment of a switch assembly 2 according to the improved concept with a switch 17 and a drive system, which is connected to the switch 17 via a drive shaft 16. The drive system includes a motor 12 which can drive the drive shaft 16 via a motor shaft 13 and, optionally, via a gear unit 15. A control device 1 of the servo drive system comprises a power section 11, which contains, for example, one or more converters, for the open-loop- or closed-loop-controlled power supply of the motor 12, and a control unit 10 for controlling the power section 11, for example via a bus 18. The switch assembly 2 may be assigned to an item of electrical equipment 19, for example a power transformer, or may be installed in or on the equipment 19.

In particular, the switch assembly of FIG. 1 may be single-phase or multi-phase. The power section 11 may contain a separate converter for each phase.

The switch assembly additionally comprises a protection circuit 14, which is coupled to a state contact of the motor 12, to one or more state contacts of the power section 11, in particular the converter of the power section 11, and the control unit 10.

The switch assembly 2, in particular the protection circuit 14, may be connected, for example, to an isolating device 20, in particular a circuit breaker, which can disconnect the equipment 19 from a power network 21.

The control unit 10, during operation of the switch assembly 2, initiates a switching operation of the switch 17, for example, a switchover between two winding taps of the equipment 19, or part of the switchover. The control unit 10, in particular if the switching operation is a critical operation, may activate, for example, a diverter switch operation or a change-over selector operation of the switch 17, or of the protection circuit 14, prior to the switching operation being initiated.

If the switching operation has been executed successfully, without faults or malfunctions, the control device, for example the power section 11, may deactivate the protection circuit 14.

If, during the switching operation, a malfunction or a fault occurs, such that both the controller 10 and the motor 12 and/or the power section 11 fail, in particular at least one converter of the power section 11, the protection circuit 14 recognizes this via corresponding error signals at the state contacts or the corresponding error signals trigger the state contacts of the protection circuit and initiate a safety measure. To this end the protection circuit 14, for example, may output an output signal, which may lead to the actuation of the isolating device 20, for example by short-circuiting two output contacts of the protection circuit 14. The safety measure is initiated here without a further checking of a state or a position of the switch 17 being performed.

If, during the switching operation, a malfunction of the motor 12 or of the power section 11 occurs, but not of the motor 12 and power section 11, the protection circuit 14 does not initiate the safety measure. In such a case, for example, the control unit 10 may initiate a safety measure depending on a state or a position of the switch 17, e.g., may actively trigger the isolating device 20. In addition, the protection circuit 14 might then not be deactivated, for example.

Figure 2:
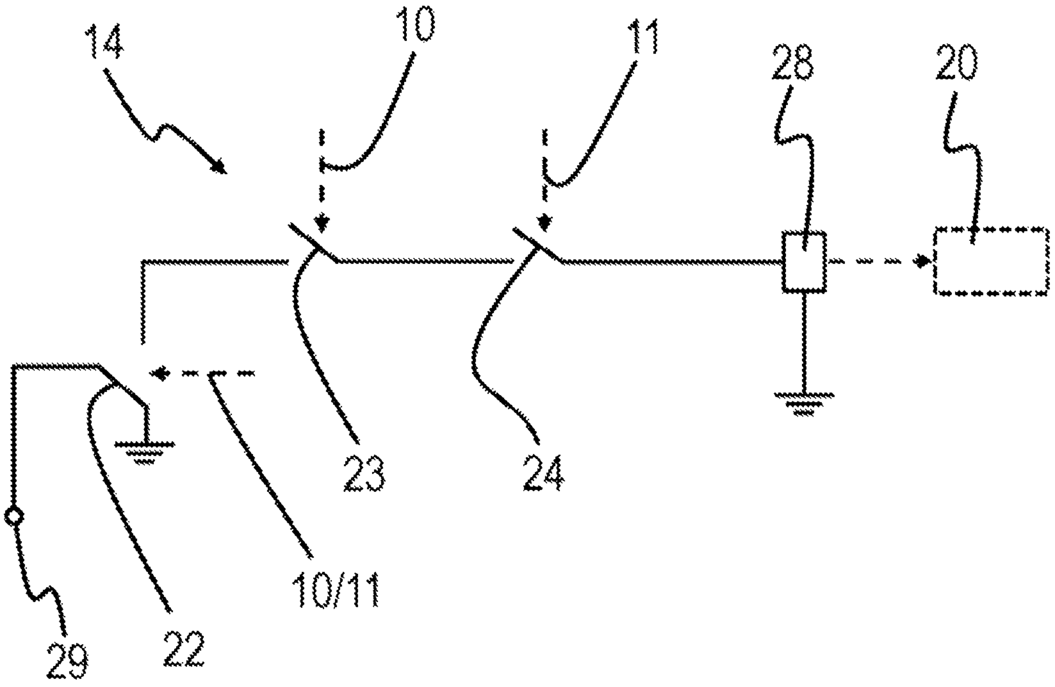
FIG. 2 is a schematic representation of a protection circuit of an exemplary embodiment of a switch assembly according to the improved concept.

FIG. 2 shows a schematic representation of a protection circuit 14 of an exemplary embodiment of a switch assembly according to the improved concept; in particular as described in relation to FIG. 1.

The protection circuit 14 includes a series circuit formed of a bistable switching element 22, for example a bistable relay, a first switch unit 23, a second switch unit 24, and an output element 28, which, for example, may be designed as a switch or relay. The series circuit is arranged between a supply voltage 29 and a reference voltage.

The bistable switching element 22 may be actuated by the control device 1. Prior to the initiation of the switching operation, the control unit 10 may actuate the bistable switching element 22 in order to connect the series circuit to the supply voltage 29 and thus activate the protection circuit 14. Before the switching operation is started, both the first switch unit 23 and the second switch unit 24 are opened.

If a malfunction of the control unit 10 occurs when the protection circuit 14 is activated, the first switch unit 23 is closed. If a malfunction of the power section 11, in particular of the converter of the power section 11, or of the motor 12 occurs when the protection circuit 14 is activated, the second switch unit 24 is closed. If both switch units 23, 24 are closed, the output element 28 is connected to the supply voltage 29 and outputs an output signal to initiate the safety measure, for example to the isolating device 20, in order to actuate same.

If, by contrast, the switching operation is successfully completed, in particular without malfunctions or faults of the motor 12, or of the power section 11, the power section 11 may thus actuate the bistable switching element 22 in order to disconnect the series circuit from the supply voltage 29 and thus deactivate the protection circuit 14.

Figure 3:
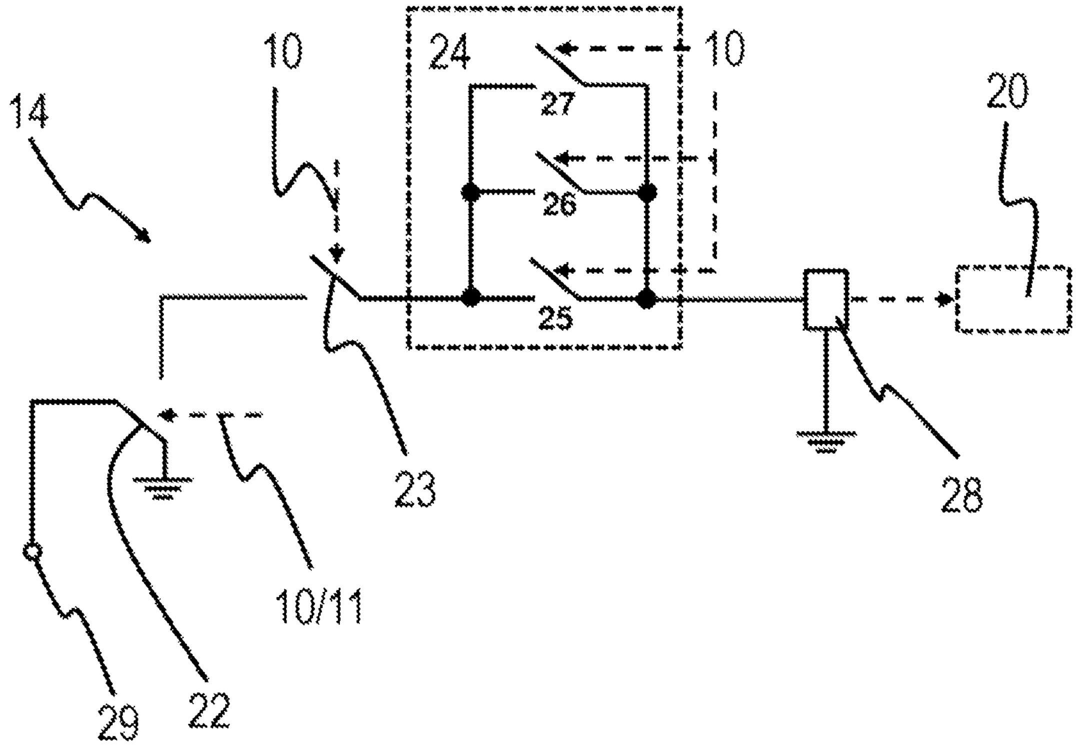
FIG. 3 is a schematic representation of a protection circuit of a further exemplary embodiment of a switch assembly according to the improved concept.

FIG. 3 shows a schematic representation of a protection circuit 14 of a further exemplary embodiment of a switch assembly according to the improved concept, in particular as described in relation to FIG. 1.

The second switch unit 24, here, comprises parallel-connected switches 25, 26, 27, each of which is assigned to a separate converter of the power section 11. By way of example and without loss of generality, parallel switches 25, 26, 27 are shown in FIG. 3, which are assigned to one each of three converters of the power section 11.

Each of the switches 25, 26, 27 is closed by the power section 11 or the assigned converter or motor if, during the switching operation, a malfunction of a fault of the corresponding converter occurs. Due to the parallel connection, a closing of one of the switches 25, 26, 27 corresponds to a closing of the first switch unit 24.

In addition, the protection circuit 14 is constructed as described in relation to FIG. 2. Reference is therefore made to the corresponding descriptions.

Due to the improved concept, the operational reliability of the tap changer assembly and of the equipment is increased. Due to the operating principle of the protection circuit, a constantly defined, reliable operation of the installation is achieved, even in the event of failure of all components during a switching operation. This safety circuit is additionally characterized in that it may be cyclically checked without a circuit breaker being triggered. In a safe position, when the protection circuit is deactivated, a failure of all components has no influence on the triggering of the circuit breaker, thus ensuring the availability.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE SIGNS

1 Control device
2 Switch assembly
10 Control unit
11 Power section
12 Motor
13 Motor shaft
14 Protection circuit
15 Gear unit
16 Drive shaft
17 Switch
18 Bus
19 Equipment
20 Isolating device
21 Power network
22 Bistable switching element
23 Switch units
24 Switching unit
25, 26, 27 Switch
28 Output element
29 Supply voltage

The invention claimed is:

1. A switch assembly, the switch assembly comprising:

a switch; and a drive system for the switch, the drive system comprising:

a motor configured to drive the switch;

a control device comprising: a power section configured to supply power to the motor; and a controller configured to initiate a switching operation of the switch by control of the power section; and a protection circuit, configured to:

detect a first error signal via a state contact of the controller in the event of a malfunction of the controller;

detect a second error signal via a state contact of the power section in the event of a malfunction of the power section; and initiate a safety measure depending on the first error signal and the second error signal, wherein the control device is configured to activate the protection circuit prior to the switching operation being initiated and to deactivate the protection circuit following execution of the switching operation.

2. The switch assembly as claimed in claim 1, wherein the protection circuit is configured to initiate the safety measure only upon the first and the second error signal indicating malfunctions of the controller and of the power section.

3. The switch assembly as claimed in claim 1, wherein:

the switch is assignable to an item of electrical equipment or is installable on or in the electrical equipment; and the safety measure comprises or is configured to trigger a disconnection of the equipment from a power network.

4. The switch assembly as claimed in claim 1, wherein the switch is an on-load tap-changer, a selector, a change-over selector, a diverter switch, a reversing change-over selector, or a double reversing change-over selector.

5. The switching assembly of claim 1, wherein the execution of the switching operation is successful when the switching operation completes a predefined operation without malfunction or fault.

6. The switch assembly as claimed in claim 1, wherein the protection circuit comprises a bistable switching element and the control device is configured to actuate the bistable switching element in order to activate or deactivate the protection circuit.

7. The switch assembly as claimed in claim 6, wherein the bistable switching element comprises a bistable relay.

8. The switch assembly as claimed in claim 6, wherein the protection circuit comprises a first switch unit and a second switch unit, which are connected in series to one another and to the bistable switching element, and wherein the first switch unit is coupled with a state contact of the motor and the second switch unit is coupled with the state contact of the power section.

9. The switch assembly as claimed in claim 8, wherein the first switch unit comprises one or more parallel-connected switches, which are configured such that at least one of which must be closed for the protection circuit to initiate the safety measure.

10. The switch assembly as claimed in claim 8, the second switch unit comprising one or more parallel-connected switches, at least one of which must be closed in order for the protection circuit to initiate the safety measure.

11. The switch assembly as claimed in claim 8, wherein:

the switch assembly comprises a further movement-relevant component;

the protection circuit comprises a further switch unit, which is connected in series to the first switch unit and the second switch unit and is coupled with a state contact of the further movement-relevant component; and the further switch unit comprises one or more parallel-connected switches, which are configured such that at least one of which must be closed so that the protection circuit can initiate the safety measure.

12. An electrical equipment comprising the switch assembly as claimed in claim 1, wherein the switch is assigned to the electrical equipment or is installed on or in the electrical equipment; and the safety measure comprises or is configured to trigger a disconnection of the equipment from a power network.

13. An equipment assembly comprising the electrical equipment as claimed in claim 12 and a circuit breaker configured to disconnect the electrical equipment from the power network, wherein the safety measure comprises an actuation of the circuit breaker.

14. A method for safely operating a switch assembly comprising a switch, which is assigned to a piece of electrical equipment controllably coupled to a power network, and a drive system for the switch, the drive system comprising a motor configured to drive the switch; a control device comprising: a power section configured to supply power to the motor; and a controller configured to initiate a switching operation of the switch by control of the power section; and a protection circuit, the method comprising:

activating the protection circuit;

initiating the switching operation of the switch by control of the power section once the protection circuit has been activated;

determining, by the activated protection circuit, whether at least one of the following is present:

a first error signal via a state contact of the motor of the drive system; or a second error signal via a state contact of the power section of the drive system; and:

initiating a safety measure, by the protection circuit, based on determining that at least one of the first error signal or the second error signal is present; and otherwise, deactivating the protection circuit following execution of the switching operation, wherein the safety measure comprises or is configured to trigger a disconnection of the piece of electrical equipment from the power network.

* * * * *